Feb. 11, 1930.  J. R. MAHAN  1,746,599
GEAR REDUCTION MEANS
Filed Sept. 9, 1927
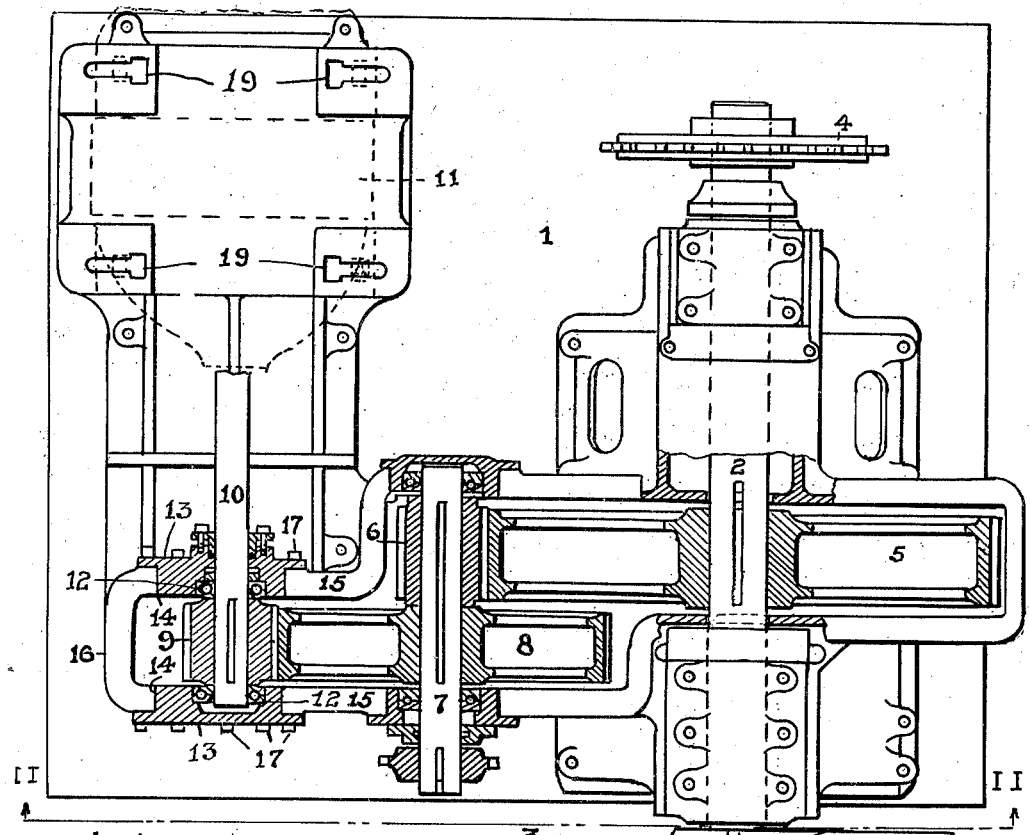
Fig 1
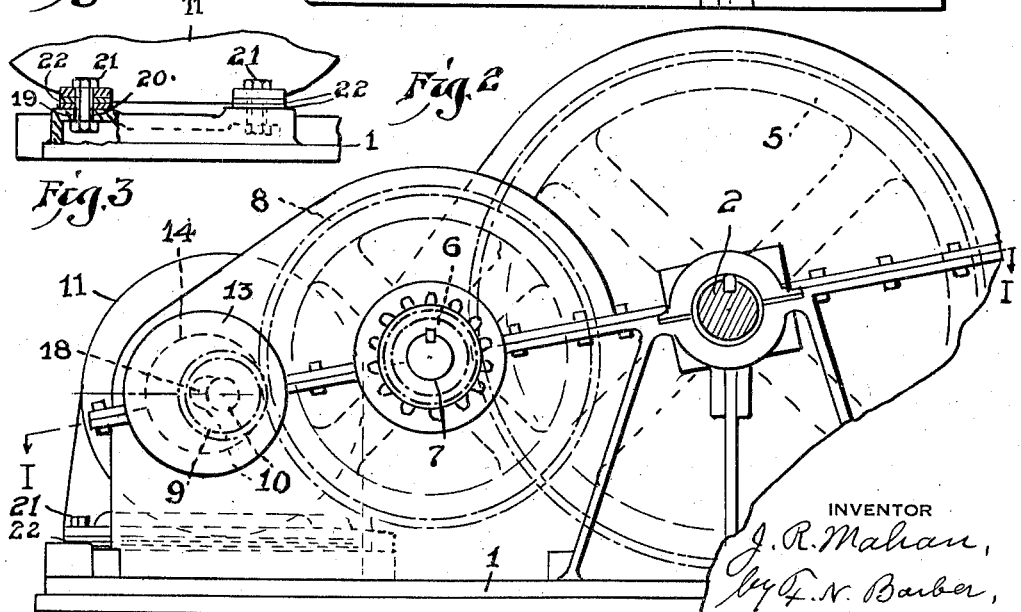
Fig 2
Fig 3
INVENTOR
J. R. Mahan,
by F. N. Barber,
attorney Patented Feb. 11, 1930

1,746,599

UNITED STATES PATENT OFFICE

JOSEPH R. MAHAN, OF TOLEDO, OHIO, ASSIGNOR TO THE NATIONAL SUPPLY COMPANY, OF TOLEDO, OHIO, A CORPORATION OF OHIO

GEAR-REDUCTION MEANS

Application filed September 9, 1927. Serial No. 218,423.

My invention relates to gear reduction means. I have illustrated my invention in connection with means for transmitting power from an electric motor to a crank designed to operate the walking beam of a well pumping apparatus. Varying field conditions require varying speeds of the pump. Where an electric motor is used operating at a constant speed in order to obtain maximum efficiency it has been necessary that the gear ratio be changed in order to effect a change in the speed of the pump. In pumping apparatus with which I am acquainted it has been necessary that the pinion and gear of one of the stages of reduction shall be changed in order to effect a change in the speed ratio. This necessitates a complete dismantling of the gear unit. It is the object of this invention to expedite the change in the speed ratio by changing only one of the gears of one of the reduction stages in order to obtain the desired speed change.

Referring to the accompanying drawing, Fig. 1 is a plan view of my invention, parts being shown in horizontal section on the line I—I of Fig. 2 and a portion being broken away; Fig. 2, a section on the line II—II of Fig. 1, and Fig. 3, a detail partly in section showing the means for connecting the motor adjustably to the base.

On the drawing 1 represents the base which supports the motor and the gears, with which my invention is concerned. 2 designates a horizontal shaft bearing at one end the crank 3 and at the other end the sprocket wheel 4. The intermediate portion of the shaft 2 has keyed thereon the gear wheel 5 which meshes with the pinion 6 keyed to the shaft 7 parallel with the shaft 2. The shaft 7 has also keyed thereon the gear wheel 8 which meshes with the pinion 9 on the shaft 10 driven by the motor 11.

The shaft 10 has bearings 12 in the eccentrics 13 arranged at opposite ends of the pinion 9 and fitting in openings 14 in the vertical walls 15 of the gear housing 16. These eccentrics are secured to the outer faces of the walls 15 by means of screws 17. As shown in Figs. 1 and 2, the pinion 9 and the gear 8 are in mesh. It is clear that if the screws 17 are removed and the eccentrics rotated 180 degrees the shaft 10 would be moved to the left horizontally to a new position as shown by the dotted line 18. This movement of the shaft to the left would move the pinion 9 away from the gear 8.

The outer eccentric 13 may be removed and the pinion 9 pulled off from the shaft 10. A pinion of larger size which will mesh with the gear 8 is then slid upon the shaft 10 and the eccentric 13 is then replaced, and both eccentrics are fastened in place by the screws 17.

In moving the shaft 10 to the left it is necessary that the motor 11 be also moved to the left. To permit this the base 1 is provided with horizontal slots 19 to contain bolts 20 carrying the nuts 21 by which the bolts are caused to clamp the motor firmly to the base 1. By loosening the nuts 21 the motor will readily move to the left with the shaft 10 and can be readily fastened to the base 1 in its new position. The motor 11 may be supported on shims or plates 22 supported by the base 1 as shown in Fig. 3. If the eccentrics are to be rotated less than 180° to the left one or more shims would be placed on the shims shown to compensate for the slight raising of the shaft 10. If the eccentrics are rotated less than 180° to the right one or more shims would be removed to compensate for the slight lowering of the shaft. At any adjustment of the shaft 10, shims of suitable thickness would be used so as to keep the shaft exactly straight.

Instead of pulling a gear from a shaft in changing the gear ratio, the shaft with its gear may be changed for another shaft which carries a suitably sized gear. Eccentrics with different eccentricities may be substituted for those shown whereby other gear ratios may be obtained.

It is thus seen that the gear ratio can be readily changed by the substitution of one pinion for another without dismantling the unit beyond the removal of one of the eccentrics 13 and the loosening and tightening of the nuts 21 and the screws 17.

I claim—

1. In a gear reduction unit, a pair of intermeshing gears, shafts carrying the gears, eccentrics containing bearings for one of the shafts and rotatable transversely of the said one of the shafts, means for securing the eccentrics in any selected rotary adjustment, a motor connected to the shaft which has bearings in the eccentrics, means whereby the motor may be shifted in accordance with the adjustment of the adjusted shaft, and means securing the motor rigidly in any selected adjustment thereof.

2. In a gear reduction unit, a pair of intermeshing gears, shafts carrying the gears, bearings for the shafts, a fixed housing for the bearings, means for shifting the bearings for one of the shafts so that the said shafts may be nearer together or further apart, one gear being readily removable so that a gear of a different diameter may be substituted therefor, in combination with a motor connected to the shiftable shaft and means whereby the motor may be adjusted in accordance with the shifting of the shiftable shaft and rigidly secured in any selected adjustment.

3. In a gear reduction unit, a casing, a pair of intermeshing gears, shafts carrying the gears, bearings for the shafts, and eccentric means surrounding the bearings of one shaft for shifting its position so that the said shafts may be nearer together or farther apart, one of the gears being readily removable so that a gear of a different diameter may be substituted therefor, the eccentric means having flanges secured to the casing and provided with body members in openings in the casing.

4. In a gear reduction unit, a pair of intermeshing gears, shafts carrying the gears, and eccentrics containing bearings for one of the shafts for shifting the position of one shaft away from or toward the other shaft, the gear on one of the shafts being readily removable so that a gear of a different diameter may be substituted therefor, in combination with a drive means connected to the shiftable shaft and means whereby the driving means may be adjusted in accordance with the shifting of the shiftable shaft and rigidly secured in any selected adjustment.

In testimony whereof, I hereunto affix my signature.

JOSEPH R. MAHAN.